US009948397B2

(12) United States Patent
Fu et al.

(10) Patent No.: US 9,948,397 B2
(45) Date of Patent: *Apr. 17, 2018

(54) DATA MAPPING METHOD AND DEVICE FOR OPTICAL TRANSPORT NETWORK

(71) Applicant: ZTE Corporation, Shenzhen (CN)

(72) Inventors: Xihua Fu, Shenzhen (CN); Huitao Wang, Shenzhen (CN); Xinling Zhang, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 300 days.

This patent is subject to a terminal disclaimer.

(21) Appl. No.: 14/432,262

(22) PCT Filed: Aug. 22, 2013

(86) PCT No.: PCT/CN2013/082117
§ 371 (c)(1),
(2) Date: Mar. 30, 2015

(87) PCT Pub. No.: WO2014/048192
PCT Pub. Date: Apr. 3, 2014

(65) Prior Publication Data
US 2015/0256258 A1 Sep. 10, 2015

(30) Foreign Application Priority Data

Sep. 29, 2012 (CN) .......................... 2012 1 0375810

(51) Int. Cl.
*H04J 14/02* (2006.01)
*H04B 10/27* (2013.01)
*H04J 3/16* (2006.01)

(52) U.S. Cl.
CPC ............ *H04B 10/27* (2013.01); *H04J 3/1664* (2013.01)

(58) Field of Classification Search
CPC .................................................. H04J 14/0227
See application file for complete search history.

(56) References Cited

U.S. PATENT DOCUMENTS

| 9,537,601 B2 * | 1/2017 | Fu ......................... H04J 3/1658 |
| 2012/0141116 A1 * | 6/2012 | Zeng ..................... H04J 3/1652 398/1 |
| 2013/0108268 A1 * | 5/2013 | Valiveti ................. H04J 3/1652 398/58 |

FOREIGN PATENT DOCUMENTS

| CN | 101945306 A | 1/2011 |
| CN | 102439995 A | 5/2012 |
| CN | 102572618 A | 7/2012 |

OTHER PUBLICATIONS

International Search Report for corresponding application PCT/CN2013/082117 filed Aug. 22, 2013; dated Nov. 28, 2013.

* cited by examiner

*Primary Examiner* — Shi K Li
(74) *Attorney, Agent, or Firm* — Cantor Colburn LLP

(57) ABSTRACT

A data mapping method and a data mapping device for an optical transport network are provided. The method includes: mapping packet service data or constant bit rate data to a Super Optical Channel Data Unit (ODUS) and mapping the ODUS to a Super Optical Channel Transport Unit (OTUS); distributing the OTUS to a plurality of electrical lane signals, dividing the plurality of electrical lane signals into one or more groups and mapping the one or more groups of electrical lane signals to corresponding Super Optical Channels (OChSi), wherein rates of the ODUS and the OTUS are both N times of 100 Gb/s, a rate of the OChSi is M times of 100 Gb/s, tributary slot sizes of the ODUS and the OTUS are both 100 Gb/s, where N is a positive integer equal to or greater than 2, i is a positive integer, and M is a positive integer equal to or greater than (Continued)

1 but less than N. The present document enables an operator to deploy a beyond-100 G optical transmission system more flexibly, without being limited to select a fixed rate, and improves the spectrum utilization rate of fiber as well as the flexibility and the compatibility of a system.

16 Claims, 7 Drawing Sheets

DATA MAPPING METHOD AND DEVICE FOR OPTICAL TRANSPORT NETWORK

TECHNICAL FIELD

The present document relates to the field of communication, and in particular, to a data mapping method and a data mapping device for an optical transport network.

BACKGROUND

The development of an optical transmission technology reveals a trend towards a higher rate on a single channel (e.g. a rate of 400 G/1 T on a single channel), a higher spectral efficiency and a high-order modulation format. Thus, the most clear and important development direction of the optical transmission technology still lies in increasing a transmission rate. High-speed transmission confronts a lot of limitations mainly in two aspects respectively described as follows. As regards the aspect 1, optical transmission technology is developing towards convergence transmission of high spectral efficiency and high-speed service interface transmission, if the spectral efficiency cannot be improved any longer, then the convergence of low speed services to a high-speed channel for transmission is not much meaningful. Nonetheless, there may be a high-speed Ethernet interface at a client side, the transmission problem of a high-speed interface still needs to be taken into consideration, thus, 400 G will be a critical point of the limit of spectral efficiency. As regards the aspect 2, as optical transmission technology is developing towards long-distance (long span and multi-span) transmission, the use of a low-loss fiber, a low-noise amplifier, reducing the cross section spacing and the application of other approaches, although capable of partly improving the Optical Signal-Noise Ratio (OSNR in short) of a system, cannot make a breakthrough, in addition, it is difficult to implement these approaches in engineering.

With the bandwidth of a bearer network required to be higher and higher, a beyond-100 G technology becomes a solution to the requirement for higher bandwidth. However, a Wavelength Division Multiplexing (WDM in short) of the conventional 50 GHz fixed grid cannot provide a sufficient spectrum width to realize a beyond-100 G technology, no matter a 400 G technology or a 1 T technology. In view of the defects in the fixed grid, a wider flexible grid is needed.

In related technologies, beyond-100 G multi-speed hybrid transmission and the flexibility of the modulation format for beyond-100 G transmission have different requirement on channel bandwidth, if a proper bandwidth is configured for each channel, then the bandwidth of a system can be fully used, thereby generating a flexible grid system. The requirement for an ultra high-speed WDM system brought by the demand for higher and higher bandwidth leads to a demand for a flexible grid technology, however, how to effectively plan and manage frequency spectrum and how to realize the compatibility of the introduced flexible grid technology to existing systems remain to be solved.

As to the problem on how to effectively plan and manage frequency spectrum after a flexible grid technology is introduced in related technologies, no effective solution has been proposed.

SUMMARY

A data mapping scheme for an optical transport network is provided in embodiments described herein to at least address the problem that it is unsolved how to effectively plan and manage frequency spectrum after a flexible grid technology is introduced in related technologies.

According to an embodiment of the present document, a data mapping method for an optical transport network is provided, including: mapping packet service data or Constant Bit Rate (CBR) data to an ODUS and mapping the ODUS to an OTUS; distributing the OTUS to a plurality of electrical lane signals, dividing the plurality of electrical lane signals into one or more groups and mapping the one or more groups of electrical lane signals to corresponding OChSi; wherein rates of the ODUS and the OTUS are both N times of 100 Gb/s, a rate of the OChSi is M times of 100 Gb/s, tributary slot sizes of the ODUS and the OTUS are both 100 Gb/s, where N is a positive integer equal to or greater than 2, i is a positive integer, and M is a positive integer equal to or greater than 1 but less than N.

In an example embodiment, mapping the packet service data or the CBR data to the ODUS and mapping the ODUS to the OTUS includes: jointly multiplexing an ODU4 bearing a low-order ODUk or the packet service data and a low-order ODUS bearing the packet service data or CBR data into a high-order ODUS, wherein the ODUk at least includes one of: an ODU0, an ODU1, an ODU2, an ODU2e, an ODU3 and an ODUflex; and mapping the high-order ODUS to the OTUS; wherein the low-order ODUS and the high-order ODUS are super optical channel data units of the same type.

In an example embodiment, the rate of each of the plurality of electrical lane signals is at least one of: 25 Gb/s, 50 Gb/s and 100 Gb/s.

In an example embodiment, the process of distributing the OTUS to the plurality of electrical lane signals, dividing the plurality of electrical lane signals into one or more groups and mapping the one or more groups of electrical lane signals to the corresponding OChSi includes: distributing the OTUS to the plurality of electrical lane signals, and dividing the plurality of electrical lane signals into L groups; and respectively mapping the plurality of electrical lane signals divided into L groups to corresponding OChSi in groups; where L is a positive integer, and i in the OChSi is an integer ranging from 1 to L.

In an example embodiment, rate levels of the OChSi are the same or different from each other.

In an example embodiment, data in each OChSi is born on a segment of successive frequency slots for transmission.

In an example embodiment, after the plurality of electrical lane signals are grouped and mapped to corresponding OChSi in groups, the method further includes: modulating the OChSi on a single optical carrier or a plurality of optical carriers for transmission.

To realize the foregoing purpose, according to another aspect of the present document, a data mapping device for an optical transport network is provided, including: a preprocessing component, configured to map packet service data or constant bit rate data (CBR) data to a Super Optical Channel Data Unit (ODUS) and map the ODUS to a Super Optical Channel Transport Unit (OTUS); and a decomposing and mapping component, configured to distribute the OTUS to a plurality of electrical lane signals, divide the plurality of electrical lane signals into one or more groups and map the one or more groups of electrical lane signals to corresponding Super Optical Channels (OChSi), wherein rates of the ODUS and the OTUS are both N times of 100 Gb/s, a rate of the OChSi is M times of 100 Gb/s, tributary slot sizes of the ODUS and the OTUS are both 100 Gb/s, where N is a positive integer equal to or greater than 2, i is a positive integer, and M is a positive integer equal to or greater than 1 but less than N.

In an example embodiment, the decomposing and mapping component includes: a grouping unit, configured to distribute the OTUS to the plurality of electrical lane signals, and divide the plurality of electrical lane signals into L groups, where L is a positive integer, and i in the OChSi is an integer ranging from 1 to L; and an optical channel mapping unit, configured to respectively map the plurality of electrical lane signals divided into L groups to corresponding OChSi in groups.

In an example embodiment, the rate of each of the plurality of electrical lane signals is at least one of: 25 Gb/s, 50 Gb/s and 100 Gb/s.

By mapping packet service data or CBR data to an ODUS and mapping the ODUS to an OTUS; distributing the OTUS to a plurality of electrical lane signals, dividing the plurality of electrical lane signals into one or more groups and mapping the one or more groups of electrical lane signals to corresponding OChSi, the solution provided in the embodiments of the present document addresses the problem that it is unsolved how to effectively plan and manage frequency spectrum after a flexible grid technology is introduced in the related technologies, enabling an operator to deploy a beyond-100 G optical transmission system more flexibly, without being limited to select a fixed rate, and improving the spectrum utilization rate of fiber as well as the flexibility and the compatibility of a system.

BRIEF DESCRIPTION OF THE DRAWINGS

The accompanying drawings described here are provided for a better understanding of the present document and constitute one part of the present document, and the exemplary embodiments of the present document and description thereof are illustrative of the present document but are not to be construed as limiting the present document. In the accompanying drawings.

DETAILED DESCRIPTION OF THE EMBODIMENTS

The present document is described below in detail with reference to accompanying drawings when read in conjunction with embodiments. It should be noted that embodiments of the present document and the features thereof can be combined with each other if no conflict is caused.

Figure 1:
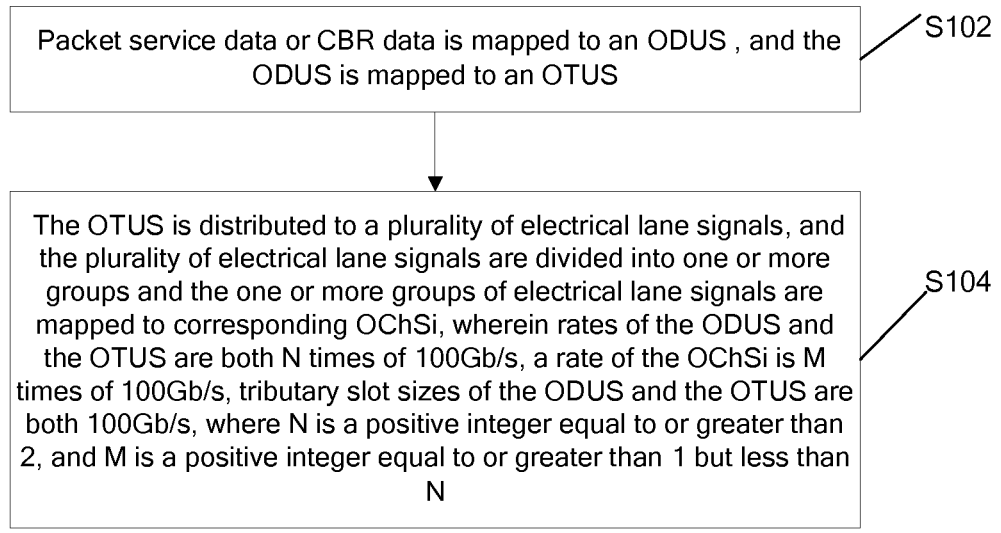
FIG. 1 is a flowchart illustrating a data mapping method for an optical transport network according to an embodiment of the present document.

According to an embodiment of the present document, a data mapping method for an optical transport network is provided. FIG. 1 is a flowchart illustrating a data mapping method for an optical transport network according to an embodiment of the present document, and as shown in FIG. 1, the method includes the following steps:

Step S102: packet service data or CBR data is mapped to a Super Optical Channel Data Unit (may be denoted by ODUS, an identifier not for limiting the term), and the ODUS is mapped to a Super Optical Channel Transport Unit (may be denoted by OTUS, an identifier not for limiting the term).

Step 104: the OTUS is distributed to a plurality of electrical lane signals, and the plurality of electrical lane signals are divided into one or more groups and the one or more groups of electrical lane signals are mapped to corresponding Super Optical Channels (may be denoted by OChSi, i is a positive integer), wherein rates of the ODUS and the OTUS are both N times of 100 Gb/s, a rate of the OChSi is M times of 100 Gb/s, tributary slot sizes of the ODUS and the OTUS are both 100 Gb/s, where N is a positive integer equal to or greater than 2, and M is a positive integer equal to or greater than 1 but less than N.

By executing the foregoing steps to map packet service data or Constant bit Rate (CBR in short) data to an ODUS, map the ODUS to an OTUS; distribute the OTUS to a plurality of electrical lane signals, divide the plurality of electrical lane signals into one or more groups and map the one or more groups of electrical lane signals to corresponding OChSi, the problem is addressed that it is unsolved how to effectively plan and manage frequency spectrum after a flexible grid technology is introduced in related technologies, thus enabling an operator to deploy a beyond-100 G optical transmission system more flexibly, without being limited to select a fixed rate, and improving the spectrum utilization rate of fiber as well as the flexibility and the compatibility of a system.

It should be noted that the ODUS, the OTUS and the OChSi have a flexible super rate.

The tributary slot size of the ODUS is 100 Gb/s, thus reducing the power consumption of hardware or chip, and compared with a tributary slot size of 1.25 Gb/s or 10 Gb/s, the method requires for less hardware resource.

In an example embodiment, in the step S102, an ODU4 (that is, an optical channel data unit the rate level of which is 100 Gb/s) bearing a low-order optical channel data unit (may be denoted by ODUk) or the packet service data and a low-order super optical channel data unit (may be denoted by ODUS(L)) bearing the packet service data or CBR data are jointly multiplexed into a high-order super optical channel data unit (may be denoted by ODUS(H)), wherein the ODUk at least includes one of: an ODU0, an ODU1, an ODU2, an ODU2e, an ODU3 and an ODUflex; and the high-order ODUS is mapped to the OTUS, wherein the ODUS(L) and the ODUS(H) are super optical channel data units of the same type. This method enables the introduced new flexible grid technology to be compatible to old technologies with high operability and achieves rational frequency spectrum planning.

In an example embodiment, the rate of each of the plurality of electrical lane signals is at least one of: 25 Gb/s, 50 Gb/s and 100 Gb/s, which are rational and highly practicable.

In the step S104, the OTUS may be distributed to a plurality of electrical lane signals; the plurality of electrical lane signals are divided into L groups, wherein the number of the electrical lane signals included in each group is identical or different; and the electrical lane signals divided into L groups are mapped to the corresponding OChSi, where L is a positive integer, and i in the OChSi is an integer ranging from 1 to L. For example, an OTUS the rate of which is 1 Tbit/s may be uniformly distributed to electrical lane signals the rate of which is 50 Gb/s, then there are totally 20 electrical lane signals. Then the electrical lane signals are divided into three groups, including two groups both consisting of 8 electrical lane signals and one group consisting of four electrical lane signals, and when mapped, the three groups correspond to OChS1, OChS2 and OChS3 respectively. If the number of the electrical lane signals included in each group is identical, then rates of the OChSi are identical, otherwise, rates of the OChSi are different correspondingly.

In an example embodiment, in the step S104, after the OTUS is distributed to a plurality of electrical lane signals, each of the electrical lane signals may be numbered, based on which a data receiving terminal may be able to align and reassemble the data of the ODUS, wherein the serial number may include a first portion which is the serial number of the tributary slot of the OTUS where the electrical lane signal exists and a second portion which is the serial number of the electrical lane signal in the plurality of electrical lane signals. This method can improve the accuracy of mapping method and the precision of data transmission. For example, an OChSi the rate of which is 400 Gb/s includes four 100 Gb/s tributary slots, if the rate of the electrical lane signal is 25 Gb/s, then the OChSi includes 16 electrical lane signals the rate of which is 25 Gb/s, and the electrical lane signal may be named OTLSm.n, where m is the serial number of a 100 Gb/s tributary slot which ranges from 1 to 4, n is the serial number of the electrical lane signal in a 100 Gb/s tributary slot, for example, if four electrical lane signals the rate of which is 25 Gb/s are included in the second 100 Gb/s tributary slot, then the four electrical lane signals may be named OTLS2.1, OTLS2.2, OTLS2.3 and OTLS2.4 respectively.

After the step S104, rate levels of all OChSi are the same or different. In an example embodiment, the data in each OChSi is born on a segment of successive frequency slots for transmission and may be in a different modulation format.

In the example embodiment above, the data mapped in the ODUS may be modulated on different optical carriers for transmission, thus improving the accuracy and the safety of a system and making full use of available discrete spectrum resources of fiber. It should be noted that a de-mapping operation needs to be implemented at a receiving terminal in a similar way.

After the step S104, the OShSi may be modulated on a single optical carrier or a plurality of optical carriers for transmission.

For example, in the implementation process, the step 104 may be as follows: the OTUS is distributed to a plurality of OChSi through a plurality of electrical lane signals OTLSm.n, where m is the serial number of a 100 Gb/s slot in the OTUS, and n is the serial number of an electrical lane signal. For example, an OTUS the rate of which is 1 Tb/s may be distributed to 20 electrical lane signals the rate of which is 50 Gb/s, then the value of m ranges from 1 to 10, because 1 Tb/s consists of ten 100 Gb/s slots; as each 100 Gb/s slot consists of two 50 Gb/s electrical lane signals, the value of n ranges from 1 to 2 to represent the serial number of an electrical lane signal in each 100 Gb/s slot. The 20 electrical lane signals may be divided into three groups, including two groups both including eight 50 Gb/s electrical lane signals and one group including four 50 Gb/s electrical lane signals, the three groups are mapped to three OChSi respectively, including two OChSi the rate of which is 400 Gb/s and one OChSi the rate of which is 200 Gb/s. Here, the rate of each OChSi is M times of 100 Gb/s, i is a positive integer, and M is equal to or greater than 1 but less than N. The rate of the electrical lane signal may be 25 Gb/s, 50 Gb/s or 100 Gb/s.

Figure 2:
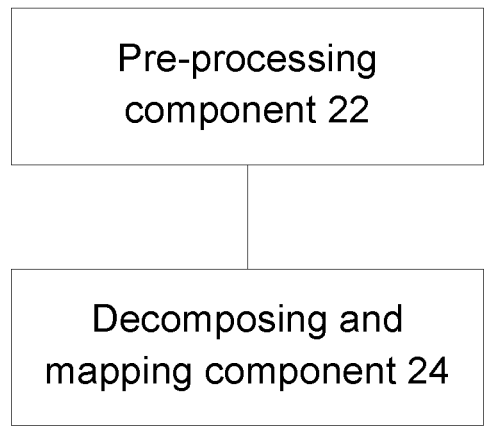
FIG. 2 is a block diagram illustrating a structure of a data mapping device for an optical transport network according to an embodiment of the present document.

A data mapping device for an optical transport network is provided corresponding to the foregoing method. FIG. 2 is a block diagram illustrating a structure of a data mapping device for an optical transport network according to an embodiment of the present document, and as shown in FIG. 2, the device includes a pre-processing component 22, configured to map packet service data or CBR data to an ODUS and map the ODUS to an OTUS; and a decomposing and mapping component 24, coupled with the pre-processing component 22, configured to distribute the OTUS to a plurality of electrical lane signals, divide the plurality of electrical lane signals into one or more groups and map the one or more groups of electrical lane signals to corresponding OChSi, wherein rates of the ODUS and the OTUS are both N times of 100 Gb/s, the rate of the OChSi is M times of 100 Gb/s, tributary slot sizes of the ODUS and the OTUS are both 100 Gb/s, where N is a positive integer equal to or greater than 2, i is a positive integer, and M is a positive integer equal to or greater than 1 but less than N.

As the pre-processing component 22 maps packet service data or CBR data to an ODUS and maps the ODUS to an OTUS, and the decomposing and mapping component 24 distributes the OTUS to a plurality of electrical lane signals, divides the plurality of electrical lane signals into one or more groups and maps the one or more groups of electrical channel signal groups to corresponding OChSi, the device addresses the problem that it is unsolved how to effectively plan and manage frequency spectrum after a flexible grid technology is introduced in related technologies, thus enabling an operator to deploy a beyond-100 G optical transmission system more flexibly, without being limited to select a fixed rate, and improving the spectrum utilization rate of fiber as well as the flexibility and the compatibility of a system.

Figure 3:
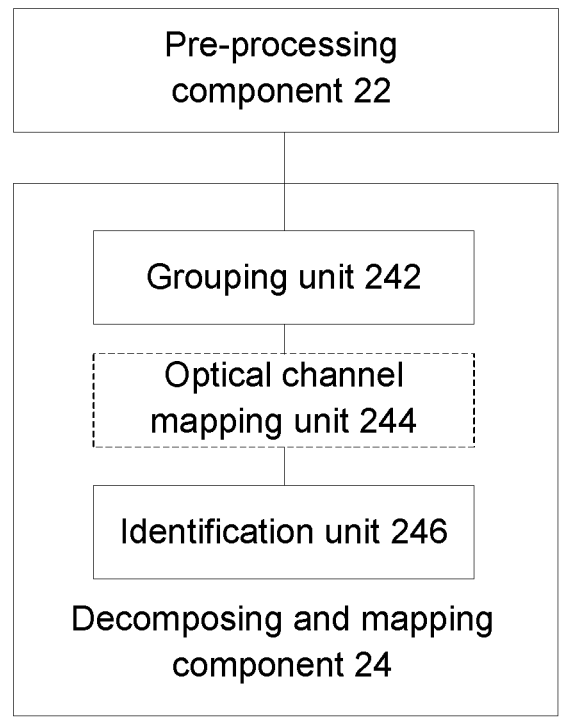
FIG. 3 is a block diagram illustrating a structure of a data mapping device for an optical transport network according to an example embodiment of the present document.

FIG. 3 is a block diagram illustrating a structure of a data mapping device for an optical transport network according to an example embodiment of the present document, and as shown in FIG. 3, the decomposing and mapping component 24 includes: a grouping unit 242 coupled with the pre-processing component 22, configured to distribute the OTUS to a plurality of electrical lane signals and divide the plurality of electrical lane signals into L groups, where L is a positive integer, and i in the OChSi is an integer ranging from 1 to L; and an optical channel mapping unit 244 coupled with the grouping unit 242, configured to map the plurality of grouped electrical lane signals to corresponding OChSi in groups.

In an example embodiment, the decomposing and mapping component 24 further includes: an identification unit 246, configured to number each of the electrical lane signals for a data receiving terminal to align and reassemble the data of the ODUS, wherein the number may include a first portion which is the serial number of the tributary slot of the OTUS where the electrical channel signal exists and a second portion which is the serial number of the electrical channel signal in the plurality of electrical lane signals.

In an example embodiment, the rate of each of the plurality of electrical lane signals is at least one of: 25 Gb/s, 50 Gb/s and 100 Gb/s.

For example, in the implementation process, the decomposing and mapping component 24 may distribute the OTUS to a plurality of electrical lane signals OTLSm.n first, where m is the serial number of a 100 Gb/s slot in the OTUS, and n is the serial number of an electrical lane signal. For example, an OTUS the rate of which is 1 Tb/s may be distributed to 20 electrical lane signals the rate of which is 50 Gb/s, then the value of m ranges from 1 to 10, because 1 Tb/s consists of ten 100 Gb/s slots; and as each 100 Gb/s slot consists of two 50 Gb/s electrical lane signals, the value of n ranges from 1 to 2, to represent the serial number of an electrical lane signal in each 100 Gb/s slot. Sequentially, the decomposing and mapping component 24 may map the plurality of electrical lane signals to a plurality of OChSi. For example, an OTUS the rate of which is 1 Tb/s may be distributed to 20 electrical lane channels, including sixteen 50 Gb/s electrical lane channels which are equally mapped in two groups to two 400 Gb/s OChSi both consisting of four 100 Gb/s; and four 50 Gb/s electrical lane channels which are mapped to a 200 Gb/s OChSi.

The implementation process of the foregoing embodiments is described below in detail with reference to accompanying drawings when read in conjunction with example embodiments.

Embodiment 1

Rather than select a fixed bit rate for an Ethernet and an Optical Transport Network (OTN in short), the data mapping method and device provided herein, with a capability of extending the architecture of the OTN, provide an ODUS having a flexible super rate. Instead of adopting a method of selecting a fixed bit rate for the next-generation optical transport network, the embodiment selects a flexible bit rate to enable an operator and a device manufacturer to make better use of advanced hardware capacity. For example, in the hardware aspect of an optical transport network, a modulator may be programmed using software to make modulation schemes, no matter modulation depth or quantity of optical carriers, selected flexibly so that the modulator can be occupied by a specific optical transmission distance, an optimized bit rate and a frequency spectrum. The flexibility provided in the embodiment can be applied in a network planning stage or after a network is deployed. Therefore, by means of the beyond-100 G data mapping method and device provided herein, an operator can deploy a beyond-100 G system more flexibly.

Figure 4:
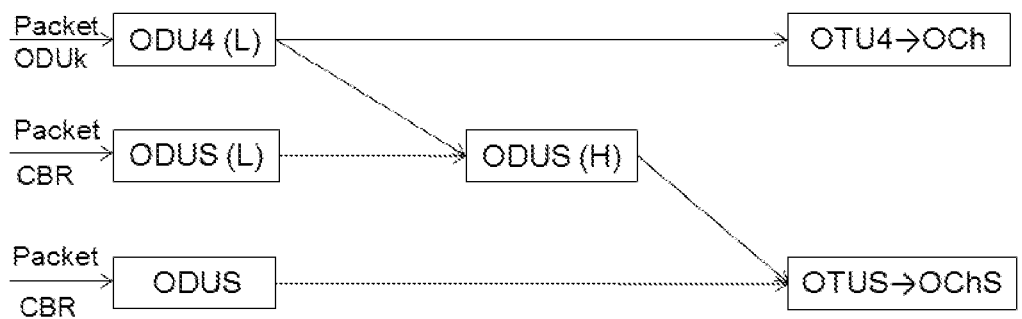
FIG. 4 is a schematic diagram illustrating a multiplexing architecture of an extended optical transport network according to an embodiment 1 of the present document.

Compared with the case where one or more fixed bit rates (e.g. ODU5 having a rate of 400 Gb/s; ODU 6 having a rate of 1 Tb/s) are selected for the next-generation OTN technology, the architecture of an OTN is extended in the embodiment. FIG. 4 is a schematic diagram illustrating a multiplexing architecture of an extended optical transport network according to an embodiment 1 of the present document. As shown in FIG. 4, a flexible Super Optical Channel Data Unit (ODUS in short) is defined, the rate of the ODUS is N times of 100 Gb/s, where N is an integer equal to or greater than 2. First, the ODUS is mapped to an OTUS carried by an OChS. That is, the mapping and multiplexing structure is ODUS-OTUS-OChS.

In the described embodiment, a tributary slot size of 100 Gb/s may be selected for the ODUS in the embodiment so that the complexity of hardware is lowered and the area and the power consumption of a chip are reduced when compared with the case where a tributary slot size of 1.25 Gb/s or 10 Gb/s is adopted. In the implementation process, an ODUS the tributary slot size of which is 100 Gb/s can bear a packet service directly or through Generic Framing Procedure (GFP in short), that is, packets can be directly mapped to the ODUS, or an ODU4 carrying an ODU0, an ODU1, an ODU2, an ODU2e, an ODU3 or an ODUflex and a low-order ODUS(L) bearing a packet or CBR service are jointly mapped (or mapped in combination) to a high-lower ODUS(H). For example, two ODU4 (total 200 Gb/s) carrying a low-order signal (ODU0, ODU1, ODU2, ODU2e, ODU3, ODUflex) or a packet service and a low-order ODUS(L) carrying a 200 G packet service are multiplexed to a 400 G high-order ODUS(H). The original OTN rate container ODUk (k=0, 1, 2, 2e, 3, flex) must be mapped to the ODU4 first, then the ODU4 is mapped to the ODUS.

In the implementation process, an OChS signal may be modulated to one or more optical carriers. The OChS signal modulated in the two ways can be both considered as a single optical signal carried on a single central frequency slot. From the point of view of architecture, a single-carrier modulation scheme which use a single successive frequency slot and a multi-carrier modulation scheme which use a single successive frequency slot should not be distinguished by a system. The bandwidth of the ODUS can be flexibly adjusted by increasing or decreasing the number of the optical carriers in a frequency slot, that is, by adjusting a frequency slot and modifying a modulation scheme using the software.

Based on the ODUS-OTUS-OChS structure described in the foregoing embodiment, fiber is required to have successive frequency spectrum resources to support the direct mapping of the ODUS to a single OChS signal. However, if the fiber cannot provide a successive frequency slot that is wide enough for bearing the capacity of the ODUS, then the method provided herein which can achieve a high frequency spectrum utilization rate may be adopted.

In the described embodiment, an ODUS may be mapped to an OTUS first, then the OTUS is distributed to a plurality of electrical lane signals, and the plurality of electrical lane signals are mapped to a plurality of OChSi (i is the serial number of the OChSi). Each OChSi signal is born by a segment of successive frequency slots. The plurality of electrical lane signals may also be numbered so that a receiving terminal is able to align and reassemble the received bit streams of the ODUS based on the serial numbers of the electrical lane signals.

Embodiment 2

Figure 5:
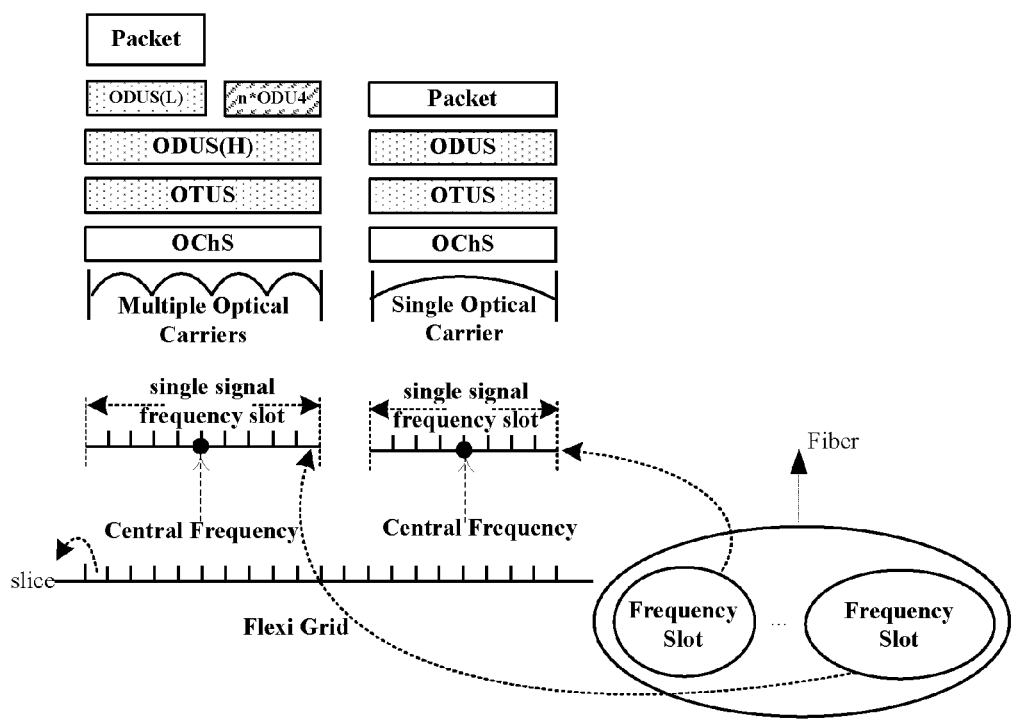
FIG. 5 is a schematic diagram illustrating a mapping and multiplexing flow of ODUS-OTUS-OChS according to an embodiment 2 of the present document.

A data mapping method and a data mapping device for a beyond-100 G optical transport network are provided in the embodiment. The data mapping method is described below by taking the mapping of two ODU4 (total rate: 400 Gb/s) carrying a low-order signal (e.g. ODU0, ODU1, ODU2, ODU2e, ODU3, ODUflex) or a packet service and a 200 Gb/s packet service into a low-order ODUS as an example, wherein the bit rate of the ODUS is 400 Gb/s. FIG. 5 is a schematic diagram illustrating a mapping and multiplexing flow of ODUS-OTUS-OChS according to an embodiment 2 of the present document, and as shown in FIG. 5, the flow includes the following steps:

Step S501: a packet service (e.g. 200 Gb/s) is mapped to a low-order ODUS(L) directly or through GFP encapsulation.

Step S502: a low-order ODUk (k=0, 1, 2, 2e, 3, flex) or a 100 Gb/s packet service is mapped to an ODU4.

Specifically, if the bandwidth needed by the packet service is just the rate level of the ODUS, then the ODUS is wholly used to bear the packet service.

Step S503: two ODU4 loading a low-order signal (e.g. ODU0, ODU1, ODU2, ODU2e, ODU3, ODUflex) or a packet service and one ODUS(L) loading a 200 Gb/s packet service are multiplexed to a higher-order ODUS together.

Step S504: the ODUS is mapped to an OTUS.

Step S505: the OTUS is mapped to an OChS, and then the OChS is modulated onto one or more optical carries for transmission.

Embodiment 3

Figure 6:
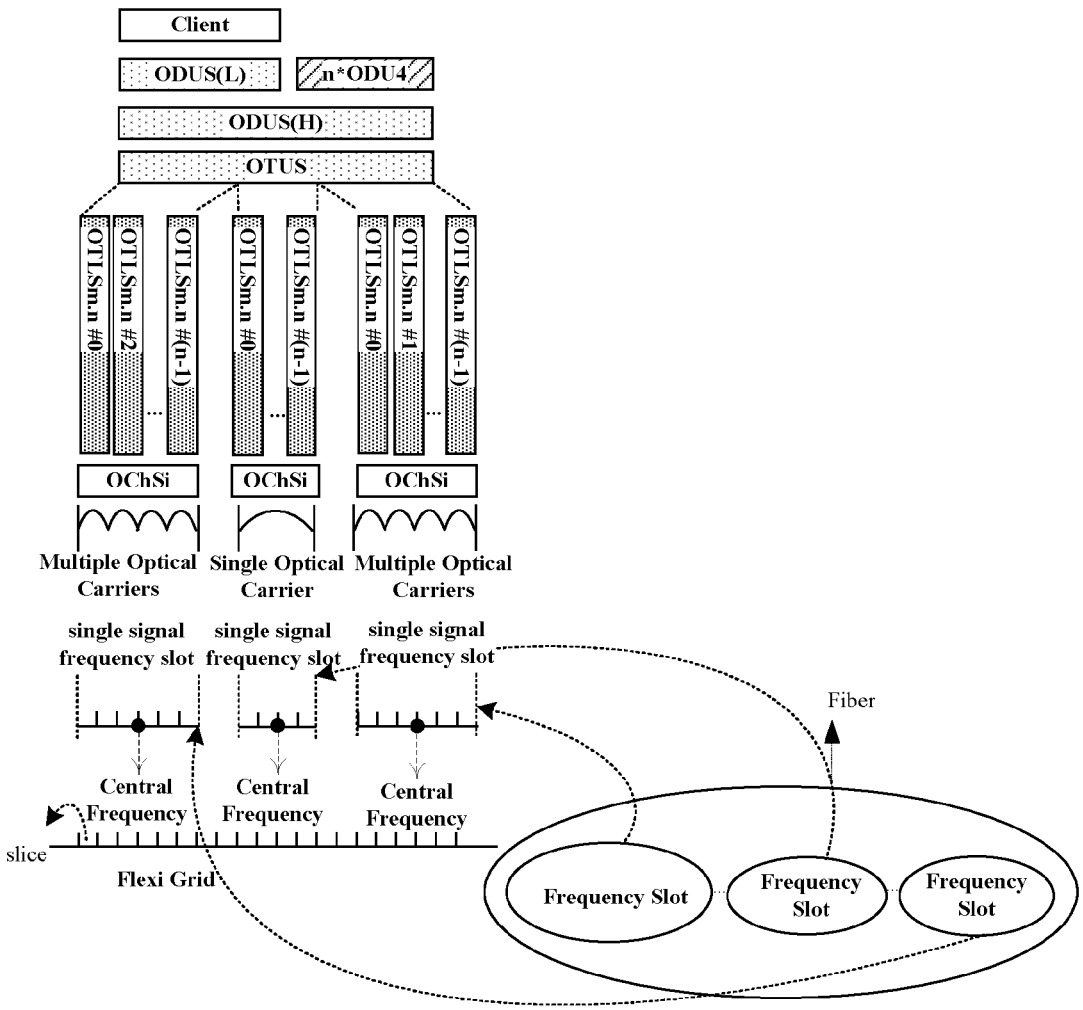
FIG. 6 is a schematic diagram illustrating a mapping and multiplexing flow of ODUS-OTUS-L*OChSi according to an embodiment 3 of the present document.

FIG. 6 is a schematic diagram illustrating a mapping and multiplexing flow of ODUS-OTUS-L*OChSi according to an embodiment 3 of the present document, and as shown in FIG. 6, the flow includes the following steps:

Step S601: a packet service is mapped to a low-order ODUS(L) directly or through GFP encapsulation.

Step S602: a low-order ODUk (k=0, 1, 2, 2e, 3, flex) or a 100 Gb/s packet service is mapped to an ODU4.

Specifically, if the bandwidth needed by the packet service is just the rate level of the ODUS, then the ODUS is wholly used to bear the packet service.

Step S603: an ODU4 loading a low-order signal (e.g. ODU0, ODU1, ODU2, ODU2e, ODU3, ODUflex) or a packet service and an ODUS(L) loading a packet service are multiplexed to a higher-order ODUS(H) together.

Step S604: the high-order ODUS(H) is mapped to an OTUS.

Step S605: the OTUS is distributed to a plurality of electrical lane signals, and the plurality of electrical lane signals are mapped in groups (e.g. in L groups) to a plurality of OChSi (i is the serial number of the OChSi). For example, first, the plurality of electrical lane signals are divided into one or more groups according to the rate of the OTUS and the rate of a selected electrical lane signal. The number of the electrical lane signals included in each group may be identical or different. Then, the plurality of electrical lane signals are mapped in groups to corresponding OChSi (that is, i in the OChSi may range from 1 to L). The rate of the OChSi may be determined according to the rate and the number of the electrical lane signals mapped into packets of the OChSi.

Step S606, the mapped OChSi are modulated on a single optical carrier or a plurality of optical carriers for transmission. Each OChSi signal is born by a segment of successive frequency slots for transmission.

Embodiment 4

Figure 7:
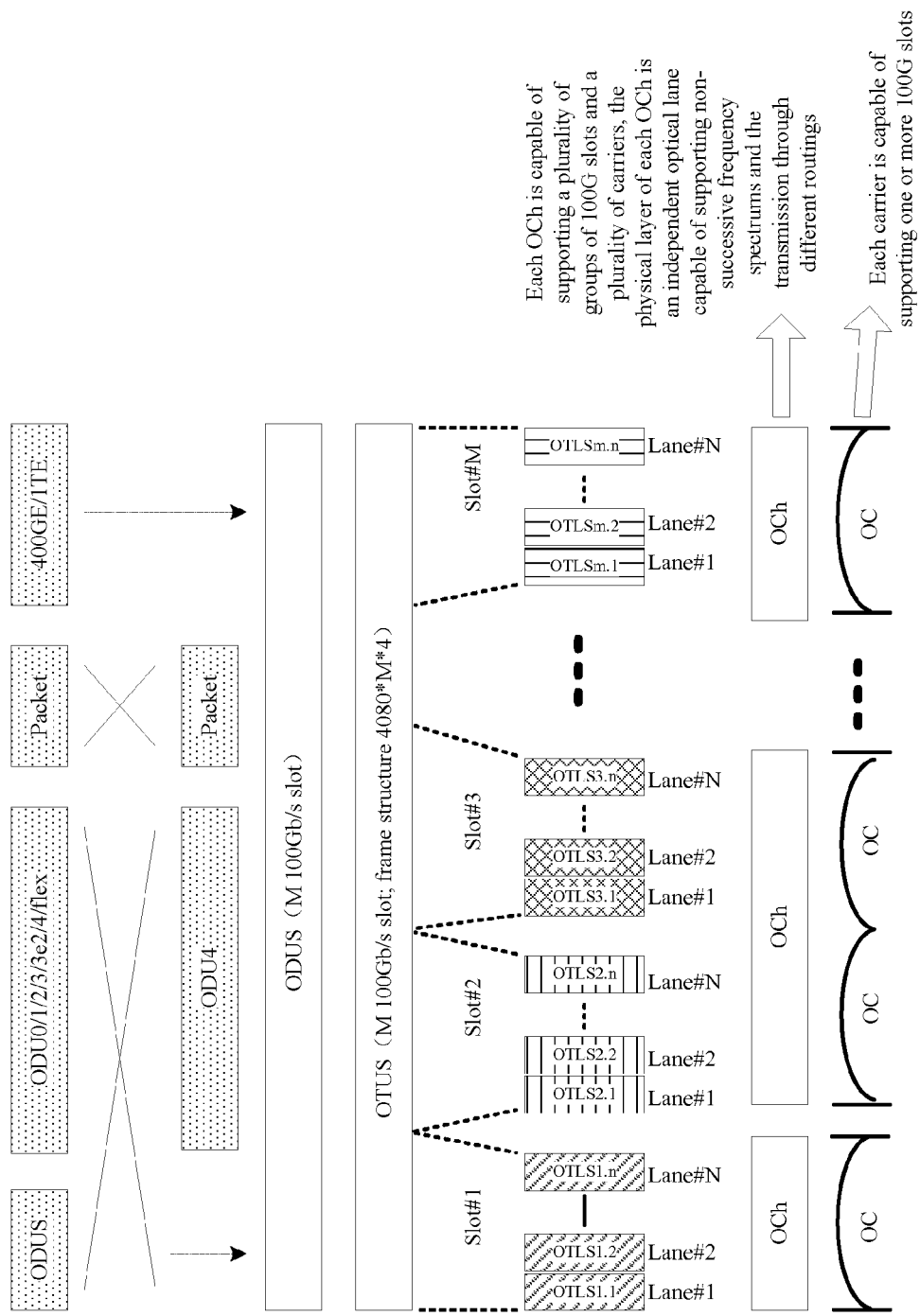
FIG. 7 is a schematic diagram illustrating a mapping and multiplexing flow of ODUS-OTUS-L*OChSi according to an embodiment 4 of the present document.

FIG. 7 is a schematic diagram illustrating a mapping and multiplexing flow of ODUS-OTUS-L*OChSi according to an embodiment 4 of the present document, and as shown in FIG. 7, the flow includes the following steps:

Step S701: all low-speed (<100 G) services are first converged to an ODU4 and then to an ODUS, and beyond-100 G services are directly mapped to the ODUS. The ODUS, with a capacity which is M (≥2) times of 100 G, supports the mapping of four services, that is, ODU4, low-speed ODUS, packet and 400 GE/1 TE. The ODUS is mapped to an OTUS.

Step S702: each OTUS corresponds to M 100 G slots, and each 100 G slot corresponds to a group of OTLSm.n.

Step S703: each group of OTLSm.n corresponds to N electrical lanes, and if N=4/2/1, then the rate of a corresponding electrical lane is 25 G, 50 G or 100 G. In OTLSm.n, m represents the serial number of a slot and is equal to or greater than 1 but equal to or less than M, and n represents the serial number of an electrical lane and is equal to or greater than 1 but equal to or less than N.

Step S704: the OTUS is mapped to a plurality of OChS (that is, OChSi, i≥1), each OChS (that is, OChSi) is capable of supporting a plurality of groups of 100 G slots and a plurality of carriers, the physical layer of the OChS is an independent optical lane, and different OChS may be transmitted through different routings. Each carrier is capable of supporting one or more 100 G slots.

Embodiment 5

Figure 8:
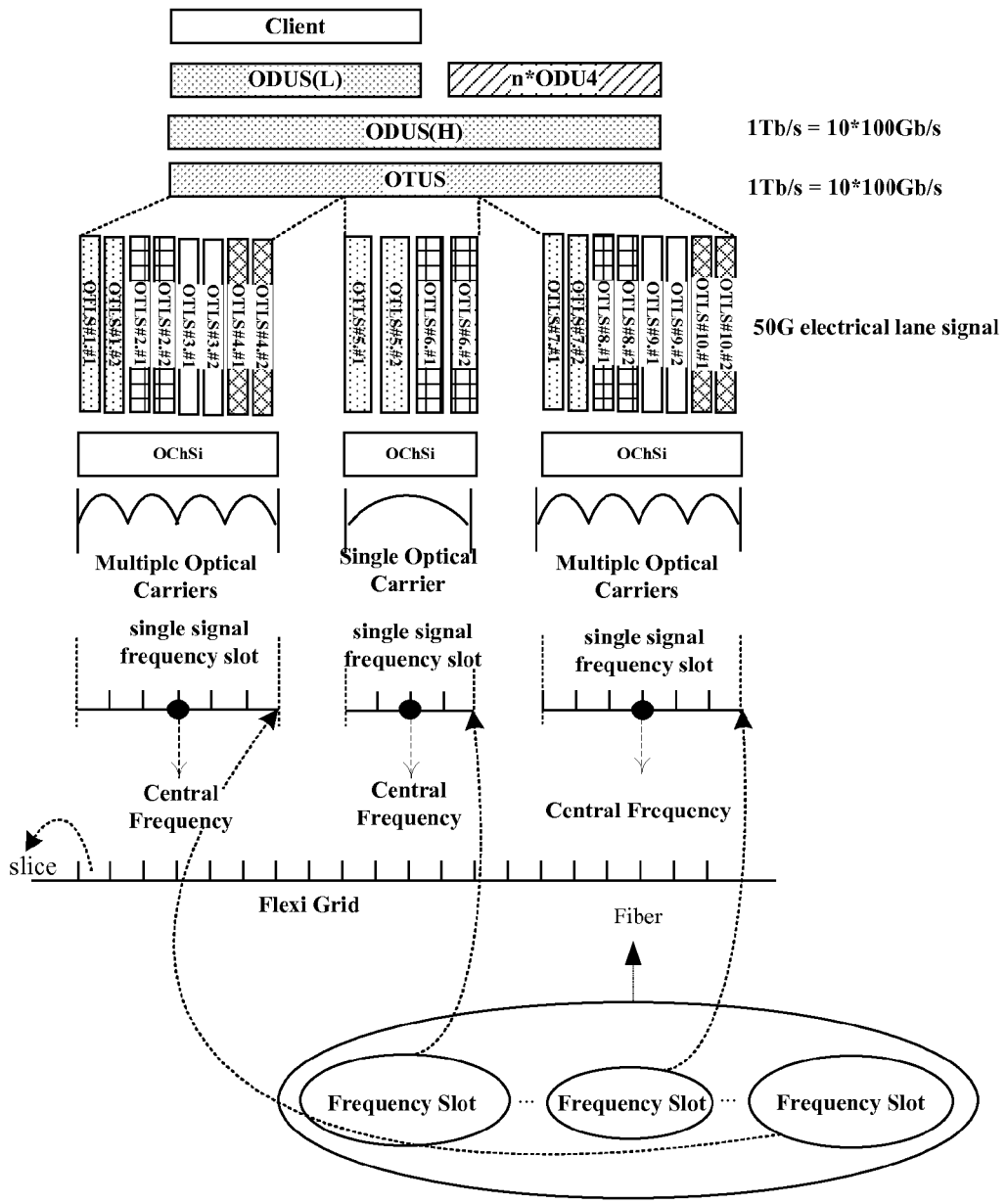
FIG. 8 is a schematic diagram illustrating a mapping and multiplexing flow of ODUS-OTUS-L*OChSi according to an embodiment 5 of the present document.

A method for beyond-100 G inverse multiplexing is provided in the embodiment, the data mapping method provided in the embodiment is described below by taking a 1 Tb/s ODUS and 1 Tb/s OTUS as an example. For example, the 1 Tb/s OTUS is inversely multiplexed to two 400 Gb/s and one 200 Gb/s. FIG. 8 is a schematic diagram illustrating a mapping and multiplexing flow of ODUS-OTUS-L*OChSi according to an embodiment 5 of the present document. As shown in FIG. 8 which illustrates a specific embodiment of the inverse multiplexing of a 1 Tb/s OTUS to two 400 Gb/s and one 200 Gb/s, the flow includes the following steps:

Step S801: a packet service (e.g. 200 Gb/s) is mapped to a low-order ODUS(L) directly or through GFP encapsulation.

Step S802: a low-order ODUk (k=0, 1, 2, 2e, 3, flex) or a 100 Gb/s packet service is mapped to an ODU4.

Step S803: an ODU4 loading a low-order signal (e.g. ODU0, ODU1, ODU2, ODU2e, ODU3, ODUflex) or a packet service and an ODUS(L) loading a packet service are multiplexed to a higher-order ODUS(H) together.

Step S804: the ODUS is mapped to an OTUS.

Step S805: the OTUS is distributed to a plurality of electrical lane signals OTLSm.n, where m is the serial number of a 100 Gb/s slot in the OTUS, n is the serial number of an electrical lane signal, for example, a 1 Tb/s OTUS may be distributed to 20 electrical lane signals the rate of which is 50 Gb/s, 1 Tb/s consists of ten 100 Gb/s slots, the value of m ranges from 1 to 10; as a 100 Gb/s slot may consist of two 50 Gb/s electrical lane signals, the value of n ranges from 1 to 2 to represent the serial number of an electrical lane signal in each 100 Gb/s slot.

Step S806: the plurality of electrical lane signals are mapped to a plurality of (L) OChSi, as shown in FIG. 8, an OTUS the rate of which is 1 Tbit/s is distributed to 20 electrical lane channels, wherein including sixteen 50 Gb/s electrical lane channels which are equally mapped in two groups to two 400 Gb/s OChSi both consisting of four 100 Gb/s; and four 50 Gb/s electrical lane channels which are mapped to a 200 Gb/s OChSi.

Step S807, each OChSi is modulated on a single optical carrier or a plurality of optical carriers for transmission.

Embodiment 6

Figure 9:
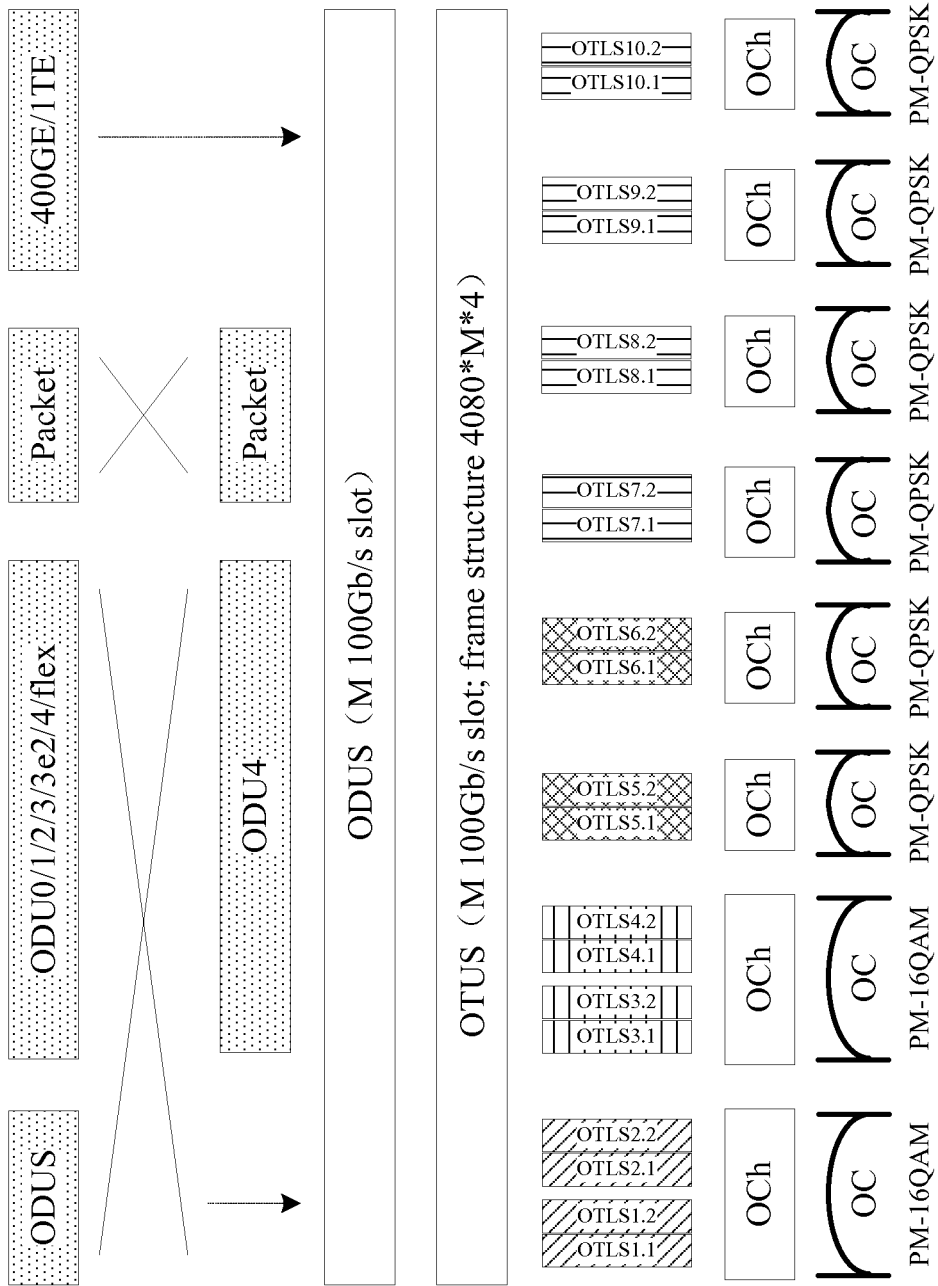
FIG. 9 is a schematic diagram illustrating a mapping and multiplexing flow of ODUS-OTUS-L*OChSi according to an embodiment 6 of the present document.

FIG. 9 is a schematic diagram illustrating a mapping and multiplexing flow of ODUS-OTUS-L*OChSi according to an embodiment 6 of the present document. As shown in FIG. 9, a method for beyond-100 G inverse multiplexing is provided in the embodiment, the data mapping method provided in the embodiment is described below by taking a 1 Tb/s ODUS and 1 Tb/s OTUS as an example. For example, the 1 Tb/s OTUS is inversely multiplexed to eight OChSi, including six 100 Gb/s OChSi adopting PM-QPSK modulation and two 200 Gb/s OChSi adopting PM-QPSK modulation. The eight OChSi are all transmitted through single carriers. The processing flow includes the following steps:

Step S901: all low-speed (<100 G) services are first converged to an ODU4 and then to an ODUS, and beyond-100 G services are directly mapped to the ODUS. The ODUS, with a capacity which is M (≥2) times of 100 G, supports the mapping of four services, that is, ODU4, low-speed ODUS, packet and 400 GE/1 TE. The ODUS is mapped to an OTUS.

Step S902: each OTUS corresponds to M 1000 slots; in the embodiment, each OTUS corresponds to ten 1000 slots, including six 1000 slots corresponding to a group of OTLSm.n and two 200 Gb/s (including two 100 Gb/s) correspond to a group of OTLSm.n.

Step S903: the OTLSm.n corresponds to two 50 Gb/s electrical lanes. In OTLSm.n, m represents the serial number of a slot and is equal to or greater than 1 but equal to or less than M, and n represents the serial number of an electrical lane and is equal to 1 or 2.

Step S904: the OTUS is mapped to a plurality of OChS each of which is capable of supporting a plurality of groups of 1000 slots and a plurality of carriers, the physical layer of the OChS is an independent optical lane, and different OChS may be transmitted through different routings. Each carrier supports one or more 1000 slots. In the embodiment, a 1 Tb/s OTUS is inversely multiplexed to eight OChSi, including six 100 Gb/s OChSi adopting PM-QPSK modulation and two 200 Gb/s OChSi adopting PM-16QAM modulation. The eight OChSi are all transmitted through single carriers.

To sum up, a method and a device for beyond-100 G data transmission of an optical transport network are provided in the embodiments of the present document which free the next-generation optical transport network from the limitation to a fixed rate and can improve the spectrum utilization rate of fiber to provide a flexible evolution method for the-next generation optical transport network.

Apparently, it should be appreciated by those skilled in the art that each component or step described in the present document can be realized by a universal computer and that the components or steps may be integrated on a single computer or distributed on a network consisting of a plurality of computers, optionally, the components or steps may be realized by executable program codes so that the components or steps can be stored in a memory to be executed by a computer, and in some cases, the steps shown or described herein can be executed in a sequence different from this presented herein, or the components or steps are formed into integrated circuit components, or several of the components or steps are formed into integrated circuit components. Therefore, the present document is not limited to the combination of specific hardware and software.

The mentioned above is only example embodiments of the present document but not limitation to the present document, it should be appreciated that various modification and variations can be devised by those of ordinary skill in the art. Any modification, substitute or improvement devised without departing from the scope of the present document should fall within the protection range as defined by the appended claims of the present document.

What is claimed is:

1. A data mapping method for an optical transport network, comprising:
mapping packet service data or constant bit rate data to a Super Optical Channel Data Unit (ODUS) and mapping the ODUS to a Super Optical Channel Transport Unit (OTUS); and
distributing the OTUS to a plurality of electrical lane signals, dividing the plurality of electrical lane signals into one or more groups and mapping the one or more groups of electrical lane signals to corresponding Super Optical Channels (OChSi);
wherein rates of the ODUS and the OTUS are both N times of 100 Gb/s, a rate of the OChSi is M times of 100 Gb/s, tributary slot sizes of the ODUS and the OTUS are both 100 Gb/s, where N is a positive integer equal to or greater than 2, i is a positive integer, and M is a positive integer equal to or greater than 1 but less than N.

2. The method according to claim 1, wherein mapping the packet service data or the constant bit rate data to the ODUS and mapping the ODUS to the OTUS comprises:
jointly multiplexing an ODU4 bearing a low-order ODUk or the packet service data and a low-order ODUS bearing the packet service data or constant bit rate data into a high-order ODUS, wherein the ODUk at least comprises one of: an ODU0, an ODU1, an ODU2, an ODU2e, an ODU3 and an ODUflex; and
mapping the high-order ODUS to the OTUS;
wherein the low-order ODUS and the high-order ODUS are ODUS of the same type.

3. The method according to claim 1, wherein the rate of each of the plurality of electrical lane signals is at least one of: 25 Gb/s, 50 Gb/s and 100 Gb/s.

4. The method according to claim 1, wherein distributing the OTUS to the plurality of electrical lane signals, dividing the plurality of electrical lane signals into one or more groups and mapping the one or more groups of electrical lane signals to the corresponding OChSi comprises:
distributing the OTUS to the plurality of electrical lane signals, and dividing the plurality of electrical lane signals into L groups; and
respectively mapping the plurality of electrical lane signals divided into L groups to corresponding OChSi in groups;
where L is a positive integer, and i in the OChSi is an integer ranging from 1 to L.

5. The method according to claim 1, wherein rate levels of the OChSi are the same or different from each other.

6. The method according to claim 1, wherein data in each OChSi is born on a segment of successive frequency slots for transmission.

7. The method according to claim 1, wherein after the plurality of electrical lane signals are grouped and mapped to corresponding ultra optical channels OChSi in groups, the method further comprises:
modulating the OChSi on a single optical carrier or a plurality of optical carriers for transmission.

8. A data mapping device for an optical transport network, comprising:
a pre-processing component, configured to map packet service data or constant bit rate data to a Super Optical Channel Data Unit (ODUS) and map the ODUS to a Super Optical Channel Transport Unit (OTUS); and
a decomposing and mapping component, configured to distribute the OTUS to a plurality of electrical lane signals, divide the plurality of electrical lane signals into one or more groups and map the one or more groups of electrical lane signals to corresponding Super Optical Channels (OChSi);

wherein rates of the ODUS and the OTUS are both N times of 100 Gb/s, a rate of the OChSi is M times of 100 Gb/s, tributary slot sizes of the ODUS and the OTUS are both 100 Gb/s, where N is a positive integer equal to or greater than 2, i is a positive integer, and M is a positive integer equal to or greater than 1 but less than N.

9. The device according to claim 8, wherein the decomposing and mapping component comprises:

a grouping unit, configured to distribute the OTUS to the plurality of electrical lane signals, and divide the plurality of electrical lane signals into L groups, where L is a positive integer, and i in the OChSi is an integer ranging from 1 to L; and an optical channel mapping unit, configured to respectively map the plurality of electrical lane signals divided into L groups to corresponding OChSi in groups.

10. The device according to claim 8, wherein the rate of each of the plurality of electrical lane signals is at least one of: 25 Gb/s, 50 Gb/s and 100 Gb/s.

11. The method according to claim 2, wherein after the plurality of electrical lane signals are grouped and mapped to corresponding ultra optical channels OChSi in groups, the method further comprises:

modulating the OChSi on a single optical carrier or a plurality of optical carriers for transmission.

12. The method according to claim 3, wherein after the plurality of electrical lane signals are grouped and mapped to corresponding ultra optical channels OChSi in groups, the method further comprises:

modulating the OChSi on a single optical carrier or a plurality of optical carriers for transmission.

13. The method according to claim 4, wherein after the plurality of electrical lane signals are grouped and mapped to corresponding ultra optical channels OChSi in groups, the method further comprises:

modulating the OChSi on a single optical carrier or a plurality of optical carriers for transmission.

14. The method according to claim 5, wherein after the plurality of electrical lane signals are grouped and mapped to corresponding ultra optical channels OChSi in groups, the method further comprises:

modulating the OChSi on a single optical carrier or a plurality of optical carriers for transmission.

15. The method according to claim 6, wherein after the plurality of electrical lane signals are grouped and mapped to corresponding ultra optical channels OChSi in groups, the method further comprises:

modulating the OChSi on a single optical carrier or a plurality of optical carriers for transmission.

16. The device according to claim 9, wherein the rate of each of the plurality of electrical lane signals is at least one of: 25 Gb/s, 50 Gb/s and 100 Gb/s.

* * * * *